United States Patent
Arnitz

(10) Patent No.: US 8,014,474 B2
(45) Date of Patent: Sep. 6, 2011

(54) METHOD AND RFID READER FOR DETECTING A DELIMITER PATTERN IN A SIGNAL STREAM

(75) Inventor: Daniel Arnitz, Kapfenberg (AT)

(73) Assignee: NXP B.V., Eindhoven (NL)

( * ) Notice: Subject to any disclaimer, the term of this patent is extended or adjusted under 35 U.S.C. 154(b) by 735 days.

(21) Appl. No.: 12/065,938

(22) PCT Filed: Sep. 5, 2006

(86) PCT No.: PCT/IB2006/053115
§ 371 (c)(1),
(2), (4) Date: Mar. 6, 2008

(87) PCT Pub. No.: WO2007/029175
PCT Pub. Date: Mar. 15, 2007

(65) Prior Publication Data
US 2008/0205558 A1    Aug. 28, 2008

(30) Foreign Application Priority Data
Sep. 9, 2005 (EP) .................................. 05108282

(51) Int. Cl.
*H04L 27/06* (2006.01)
*H03D 1/00* (2006.01)
(52) U.S. Cl. ........ 375/343; 375/340; 375/369; 375/371; 375/373; 370/509

(58) Field of Classification Search .................. 375/340, 375/343, 342, 369, 371, 373; 370/509
See application file for complete search history.

(56) References Cited

U.S. PATENT DOCUMENTS

| | | |
|---|---|---|
| 2001/0028691 A1 | 10/2001 | Posch |
| 2002/0015436 A1 | 2/2002 | Ovard et al. |
| 2002/0089967 A1* | 7/2002 | Brajal et al. ............... 370/347 |
| 2003/0206559 A1* | 11/2003 | Trachewsky et al. ....... 370/509 |
| 2004/0218699 A1* | 11/2004 | Carsello ...................... 375/343 |
| 2008/0039107 A1* | 2/2008 | Ma et al. ..................... 455/450 |

* cited by examiner

*Primary Examiner* — Phuong Phu

(57) ABSTRACT

A method for detecting a delimiter pattern (SOF) in a signal stream containing a carrier or subcarrier modulated by the delimiter pattern comprises: specifying an expected delimiter occurrence time (t1) of an occurrence of the delimiter pattern and a tolerance zone (tz) within which the expected delimiter occurrence time (t1) may jitter; approximating, within the tolerance zone (tz), a zero of a cross correlation function (CCF) of the data stream with the delimiter pattern, or detecting the phase (φ) of the carrier or subcarrier in respect to an arbitrarily defined reference position within the tolerance zone (tz), e.g. in respect to the expected delimiter occurrence time (t1); calculating a first maximum of the cross correlation function (CCF) within the tolerance zone (tz) by use of the approximated zero or phase (φ); calculating all other maxima of the cross correlation function (CCF) within the tolerance zone (tz); detecting the highest maximum among the calculated maxima, which highest maximum is representative for the moment in time of occurrence of the delimiter pattern.

11 Claims, 7 Drawing Sheets

METHOD AND RFID READER FOR DETECTING A DELIMITER PATTERN IN A SIGNAL STREAM

FIELD OF THE INVENTION

The invention relates to a method for detecting a delimiter pattern in a signal stream, wherein the signal stream contains a carrier or subcarrier modulated by the delimiter pattern.

The invention further relates to an RFID reader being configured to detect a delimiter pattern in a signal stream, wherein the signal stream contains a carrier or subcarrier modulated by the delimiter pattern.

The invention further relates to a computer program product directly loadable into the memory of a programmable RFID reader, comprising software code portions for performing the steps of a method according to the first paragraph when said product is run on the RFID reader.

BACKGROUND OF THE INVENTION

The detection of delimiter patterns contained in electromagnetic signals that are transmitted from RFID tags to RFID readers is a vital part in an RFID system, since most data exchange protocols used in RFID systems rely on the recognition of delimiter patterns. For instance, when applying a frame based data exchange protocol a data frame usually comprises a leading start of frame (SOF) pattern, followed by control flags and/or data bytes and a trailing end of frame (EOF) pattern signaling that the transmission of the data frame has been completed. The SOF and EOF patterns constitute delimiters with unique signal patterns. For illustration purposes only an example of a SOF pattern according to international standard ISO 15693 is shown in the diagram of FIG. 1. This SOF pattern (based on a carrier frequency fc: 13.56 MHz, load modulation, ASK with one subcarrier of fc/32 ~423.75 kHz) comprises three parts, namely an unmodulated time period (56.64 µs), followed by 24 pulses of fc/32 (~423.75 kHz), followed by a logic 1 which starts with an unmodulated time of 256/fc (~18.88 µs), followed by 8 pulses of fc/32 (~423.75 kHz). The overall length of the SOF pattern corresponds to the length of four data bits.

While, at first glance, it seems easy to detect this pattern by simple edge detection, in practice things are much more complicated. This will be appreciated when comparing the ideal SOF pattern of FIG. 1 with the signal stream according to the diagram of FIG. 2, which signal stream is an actual input signal received at an RFID reader from an RFID tag. As will be noted the signal stream of FIG. 2 is heavily distorted and superimposed by noise, so that the SOF pattern, which is contained in the signal stream between the boundaries of the light-gray shaded portion A, can hardly be recognized. It should be emphasized that the representation of the signal stream of FIG. 2 is not exaggerated, but such signals frequently appear in common environments. If SOF detection fails, the decoders within the RFID reader cannot compensate for that and consequently the data detection fails.

Document US 2001/0028691 A1 discloses a data carrier adapted to receive data in the form of data blocks, which data blocks include delimiter data and useful data. The data carrier includes delimiter data detection means adapted to detect delimiter data of a data block and to generate and supply at least one useful data start signal, in which also after the supply of the useful data start signal the delimiter data can be re-detected continually and the useful data start signal can be generated and supplied. The delimiter data detection means of this known data carrier works on the basis of bit level detection.

Unfortunately, the more immune the delimiter detection should be to distortions, the more computing power is needed (square performance in case of full correlation). By correlating the input signal with the whole delimiter pattern the best results can be achieved, but this approach is the worst case in respect of performance considerations.

An additional problem with delimiter detection in RFID systems is that the starting time of a response of an RFID tag to a request of an RFID reader cannot exactly be predicted, but tolerances in time have to be taken into account. This is illustrated in the diagram of FIG. 5. Here, an RFID reader upon sending a request REQ expects to receive a response of the RFID tag consisting of a leading SOF pattern, followed by the response data RESP, and a trailing EOF pattern. The SOF and EOF pattern act as delimiters. The SOF pattern must arrive at the RFID reader at an expected delimiter occurrence time t1 after the request REQ has been sent. However, the expected delimiter occurrence time t1 may jitter by the tolerance zone tz. For instance, the tolerance zone tz may sum up to 50% of the duration of a half-bit (Manchester coding). This tolerance zone tz cannot be used for data decoding, so that such RFID readers are very sensitive to distortions of the input signals, since even short distortions may result in detection errors. A solution for this problem is the above mentioned computational intensive correlation of the input signal with the delimiter pattern.

FIG. 6A shows the correlation result (4096 correlation values) of an ideal (sinusoidal) SOF pattern with the square SOF pattern of FIG. 1. The maximum of the correlation result has to be somewhere within the tolerance zone tz, which is represented by a gray shaded area. FIG. 6B shows a zoomed portion of the correlation function of FIG. 6A wherein the zoomed portion comprises the correlation values with the indices 1750 to 2350. According to standard ISO 15693 the tolerance zone tz spans about ±2.36 µs, i.e. about 4.7 µs, it includes 64 correlation values at fs=13.56 MHz. Correlation values are calculated each 74 ns which makes very high demands on the computational capacity of the RFID reader.

OBJECT AND SUMMARY OF THE INVENTION

It is an object of the invention to provide a method of the type defined in the opening paragraph and an RFID reader of the type defined in the second paragraph, in which the disadvantages defined above are avoided.

In order to achieve the object defined above, with a method according to the invention characteristic features are provided so that a method according to the invention can be characterized in the way defined below, that is:

A method for detecting a delimiter pattern in a signal stream, wherein the signal stream contains a carrier or subcarrier modulated by the delimiter pattern, wherein the method comprises:

specifying an expected delimiter occurrence time of an occurrence of the delimiter pattern and a tolerance zone within which the expected delimiter occurrence time may jitter;

approximating, within the tolerance zone, a zero of a cross correlation function of the data stream with the delimiter pattern, or detecting the phase of the carrier or subcarrier in respect to an arbitrarily defined reference position within the tolerance zone, e.g. in respect to the expected delimiter occurrence time;

calculating a first maximum of the cross correlation function within the tolerance zone by use of the approximated zero or phase;

calculating all other maxima of the cross correlation function within the tolerance zone;

detecting the highest maximum among the calculated maxima, which highest maximum is representative for the moment in time of the occurrence of the delimiter pattern.

It should be mentioned that calculating a first and all other maxima of the cross correlation function within the tolerance zone implies that the index of these points is calculated too.

In order to achieve the object defined above, with an RFID reader according to the invention characteristic features are provided so that the RFID reader carries out the steps of the method according to the present invention.

In order to achieve the object defined above, with a computer program product according to the invention characteristic features are provided so that a computer program product according to the invention is directly loadable into the memory of a programmable RFID reader, wherein the computer program product comprises software code portions for performing the steps of a method according to the invention when said product is run on the RFID reader.

In order to achieve the object defined above, an RFID reader according to the invention comprises an arithmetic-logic unit and a memory and processes the computer program product according to the above paragraph.

The characteristic features according to the invention provide the advantage that the computation effort necessary for detecting delimiters is remarkably reduced, yet there is still a quality of the delimiter detection achieved that is comparable to that of a complete cross correlation of the input signal received at the RFID reader with a complete delimiter signal pattern. Depending on the sampling frequency and implementation the computation effort needed for carrying out the present invention is e.g. only one hundredth of the computation effort necessary for complete correlation processes.

The present invention provides the further advantage that, compared with edge detection, by detecting the carrier phase during the delimiter detection process distortions are much better suppressed than in conventional delimiter detection processes.

The present invention is applicable in a wide range of RFID systems provided that the following conditions are met:

The signal pattern of the delimiter is known.

The input signals at the RFID reader have such a signal form that correlating these signals with a delimiter pattern yields a correlation result with an approximately periodic signal form, at least within a tolerance zone of the expected delimiter occurrence time, so that the period of the correlation function and consequently the positions of all maxima of the correlation function occurring within the tolerance zone can be computed.

The measures as claimed in claim 2 or claim 3, respectively, provide the advantage that a good approximation of the portion of interest of the cross correlation function is achieved by only calculating a few cross correlation points and linearly interpolating the calculated cross correlation points. Hence, the demands to computation performance are quite low.

The measures as claimed in claim 4 provide the advantage that even in case of distortions of the signal stream a satisfying delimiter detection result can be achieved.

The measures as claimed in claim 5 provide the advantage that a quality of delimiter detection can be achieved that is absolutely comparable to that of full correlation, but the computation effort has been dramatically reduced. Discrete fourier transformation (DFT) is carried out for those parts of the SOF pattern where the subcarrier is present, which results in a moderate computation effort. However, the more data is present for discrete fourier transformation, the less distortions will be able to affect the system, but the more computing power is needed. It should further be noted that discrete fourier transformation is only applicable to such signals having a signal form wherein the signal phase is detectable within the DFT portion. This implies that the frequency of the signal within the DFT portion is approximately constant.

It should further be noted that the features of the inventive method can be directly implemented in the RFID reader.

The aspects defined above and further aspects of the invention are apparent from the exemplary embodiment to be described hereinafter and are explained with reference to this exemplary embodiment.

BRIEF DESCRIPTION OF THE DRAWINGS

The invention will be described in more detail hereinafter with reference to an exemplary embodiment. However, the invention is not limited to this exemplary embodiment.

DESCRIPTION OF EMBODIMENTS

Figure 3:
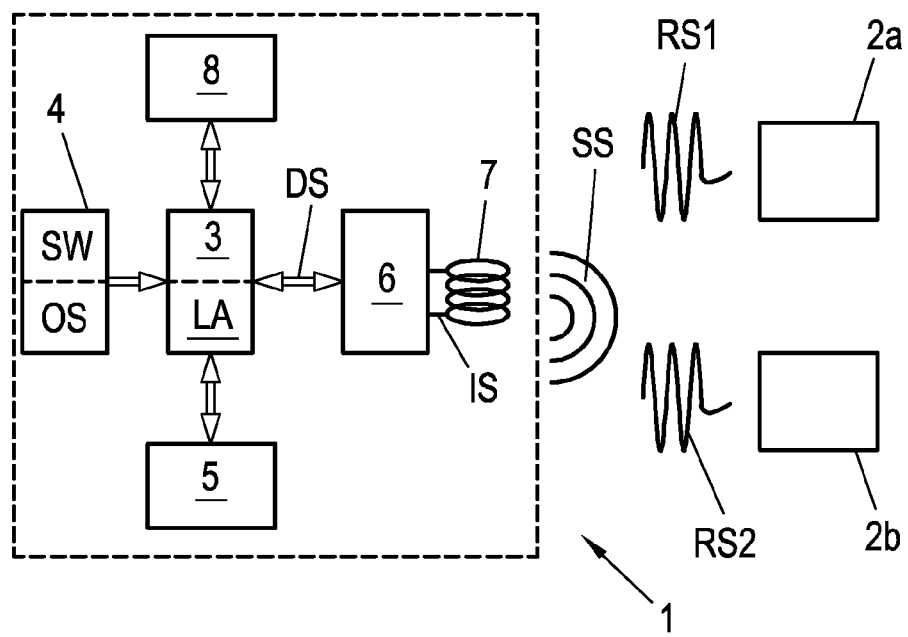
FIG. 3 shows a schematic block circuit diagram of an RFID system.

FIG. 3 shows a schematic block circuit diagram of an RFID (Radio Frequency Identification) system comprising an RFID reader 1 and a number of RFID tags 2a, 2b, wherein, for the sake of clearness, only two RFID tags are depicted. RFID reader 1 communicates with the RFID tags 2a, 2b in a contactless manner via modulated electromagnetic signals, provided the RFID tags 2a, 2b are within the transmission and receiving range of the RFID reader 1. The RFID reader 1 comprises control means 3, like a microprocessor or microcontroller, which control means 3 communicate via a data bus with program storage means 4. The program storage means 4 is adapted to store an operating system OS for basic operation of the control means 3 and application program code SW to be processed by the control means 3. The program storage means 4 may be configured as a non-volatile memory, like a PROM, EPROM, EEPROM or the like. The program storage means 4 may also be configured as a user definable ASIC, PAL or the like. Further, the control means 3 and the program storage means 4 may be integrated into a single chip. It should be observed that the application program code SW and the operating system OS may be integrated. The control means 3 further communicate with a random access memory 5. The control means 3, when processing the program code SW, cooperate with input/output means 8, which e.g. can be configured as a link interface to a computer. The control means 3 further communicate with radio frequency communication means 6 which are connected to an antenna 7 for transmitting electromagnetic signals SS to the RFID tags 2a, 2b. These electromagnetic signals SS may be used for both transmitting data to the RFID tags 2a, 2b and energizing the RFID tags 2a, 2b if they are configured as passive tags. The RFID tags 2a, 2b respond to the RFID reader with response signals RS1, RS2. Data exchange between the RFID reader 1 and the RFID tags 2a, 2b may be accomplished by standard data transmission protocols and standard modulation methods. For instance, the electromagnetic signal SS sent from the RFID reader 1 to the RFID tags 2a, 2b is configured as a pulse-width modulated signal. The response signals RS1, RS2 from the RFID tags 2a, 2b to the RFID reader are e.g. load modulated signals, wherein a carrier signal or subcarrier signal contained in the electromagnetic signal SS is modulated by switching a load impedance connected to the antennas of the RFID tags 2a, 2b, so that varying energy is drawn from the carrier signal or subcarrier signal. Switching the load impedances at the RFID tags causes a change of the impedance of the antenna 7 of the RFID reader 1 and hence a varying amplitude of the voltage at the antenna 7 of the RFID reader 1, which varying voltage amplitude represents an input signal IS to the radio frequency communication means 6. For recovery of data contained in the input signal IS the input signal IS is rectified or demodulated by radio frequency communication means 6, yielding data stream signal DS. The control means 3 extract the data coded in the data stream signal DS, e.g. by comparing it with defined bit levels.

Figure 4:
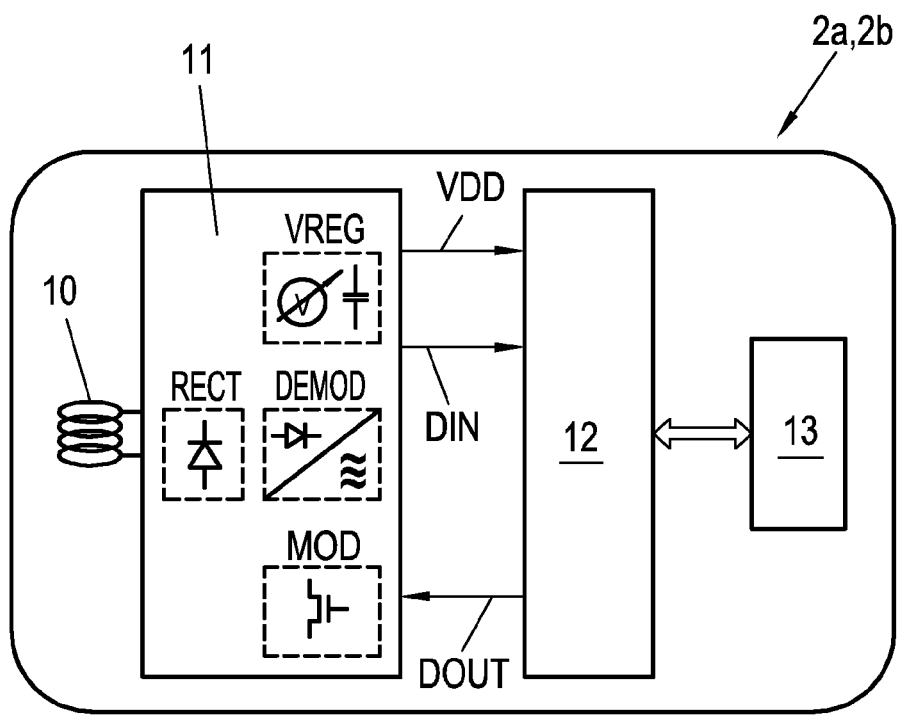
FIG. 4 shows a schematic block circuit diagram of an RFID tag.

FIG. 4 shows a schematic block circuit diagram of an exemplary embodiment of the RFID tags 2a, 2b. It should be observed that the configuration of the RFID tags 2a, 2b is not part of the present invention, but is explained only for a comprehensive understanding of the present invention. Each RFID tag 2a, 2b is configured as a passive tag and comprises an antenna 10, an analogue radio frequency interface 11 that is connected to the antenna 10, a digital control unit 12 that is connected to the analogue radio frequency interface 11, and a memory 13 that is connected to the digital control unit 12. The memory 13 is a non-volatile memory, like an EEPROM, so that data that are written into the memory 13 during communication with the RFID reader 1 remain stored even when the RFID tag 2a, 2b is switched off, e.g. because it leaves the transmitting range of the RFID reader 1 and is therefore not longer energized by the RFID reader 1. Memory 13 may also contain program code for operating the digital control unit 12 and a unique identification number. Antenna 10 receives the electromagnetic signals SS from the RFID reader 1 and passes them to the analogue radio frequency interface 11. In general, the analogue radio frequency interface 11 comprises a rectifier REG and a voltage regulator VREG with integrated energy storage element, like a capacitor, to derive from the received electromagnetic signals SS the necessary operating voltage VDD for the digital control unit 12 and the memory 13. Further, analogue radio frequency interface 11 comprises a demodulator DEMOD to extract data DIN from the electromagnetic signals SS and to pass them to the digital control unit 12. Digital control unit 12 processes the received data DIN and may respond to the RFID reader 1 by creating output data DOUT and passing them to the analogue radio frequency interface 11. Analogue radio frequency interface 11 comprises a modulator MOD that modulates the output data DOUT and transmits the modulated signals as response signals RS1, RS2 via antenna 10.

Figure 5:
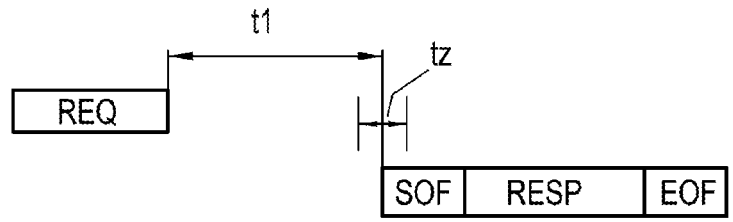
FIG. 5 shows a timing diagram of the communication between an RFID reader and an RFID tag.

As has been explained above by way of FIG. 5 the RFID reader 1 communicates with an RFID tag 2a, 2b by sending out a request REQ, expecting to receive a response from the RFID tag 2a, 2b within the tolerance zone tz of expected delimiter occurrence time t1. It should be noted that the values of the expected delimiter occurrence time t1 and the tolerance zone tz are set in accordance with the applied data transmission protocol. For correct data detection it is essential to know exactly when the response arrives. This is done by detecting the SOF pattern heading the response data RESP. While detecting the SOF pattern could be carried out by analyzing the input signal IS in the radio frequency communication means 6, this is not preferred, since due to the very high frequency of the carrier it would require a tremendous computation performance. Rather, it is preferred to detect the SOF pattern in the data stream signal DS that contains the modulated subcarrier.

Figure 7:
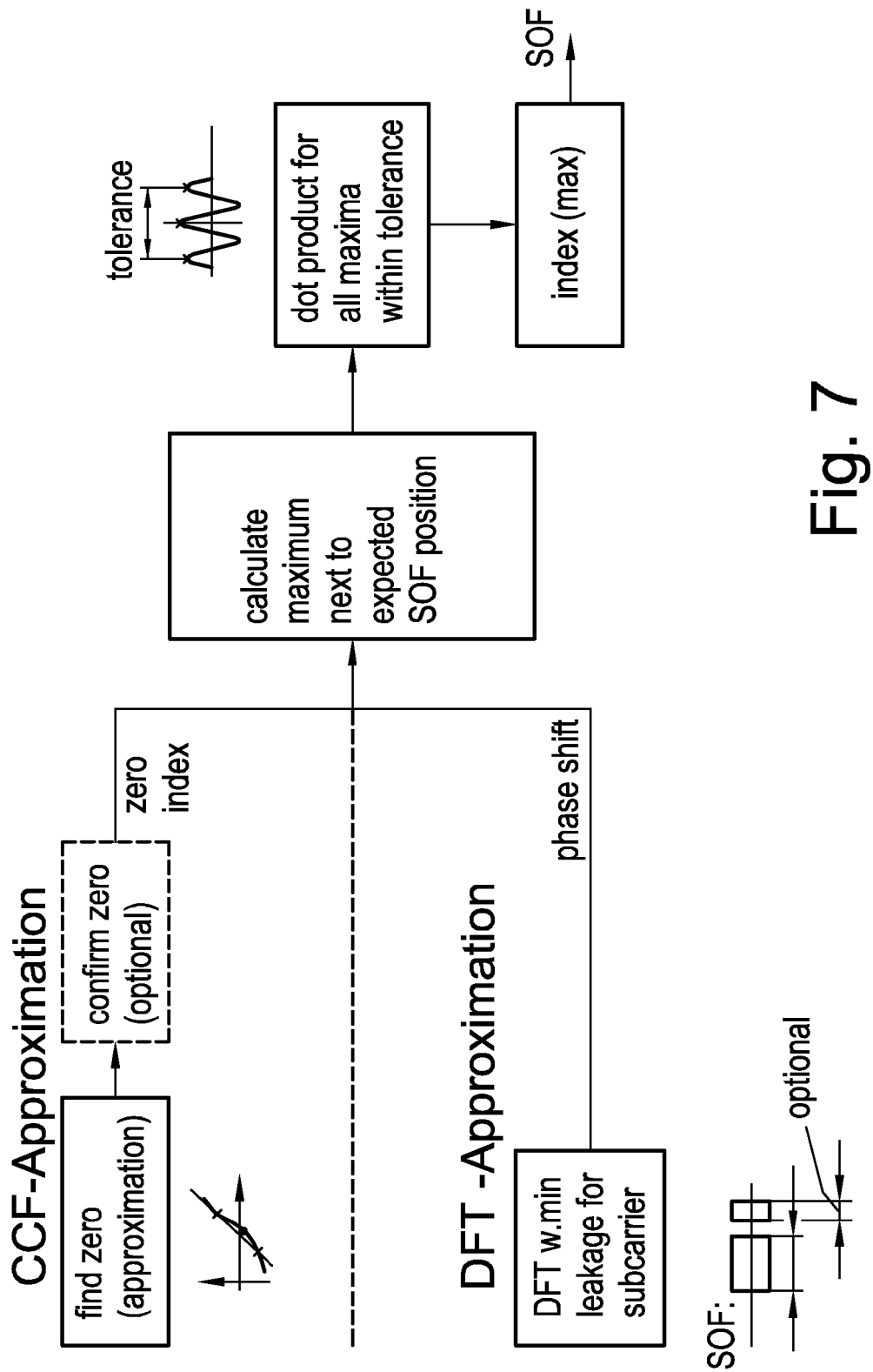
FIG. 7 shows in a schematic block diagram the process for detecting delimiters according to the present invention.

FIG. 7 shows in a schematic block diagram the process for detecting delimiters according to the present invention. With reference to this block diagram the individual steps of this process are explained in detail.

First, the cross correlation function (CCF) approximation will be explained. This CCF approximation comprises the step "Find Zero" and optionally a step "Confirm Zero".

Find Zero

Zero detection is performed by approximation. Only a few correlation values are calculated to find a zero of the cross correlation function CCF near the expected SOF position. The algorithm works according to the flowchart displayed in FIG. 8. In this flowchart, dotp(x) denotes the dot product of x with the SOF pattern and index(min(|a|, |b|)) returns the cross calculation value index of a if |a|<|b| and the cross calculation value index of b if |a|>|b|. For |a|=|b| it does not matter which index is returned.

Figure 8:
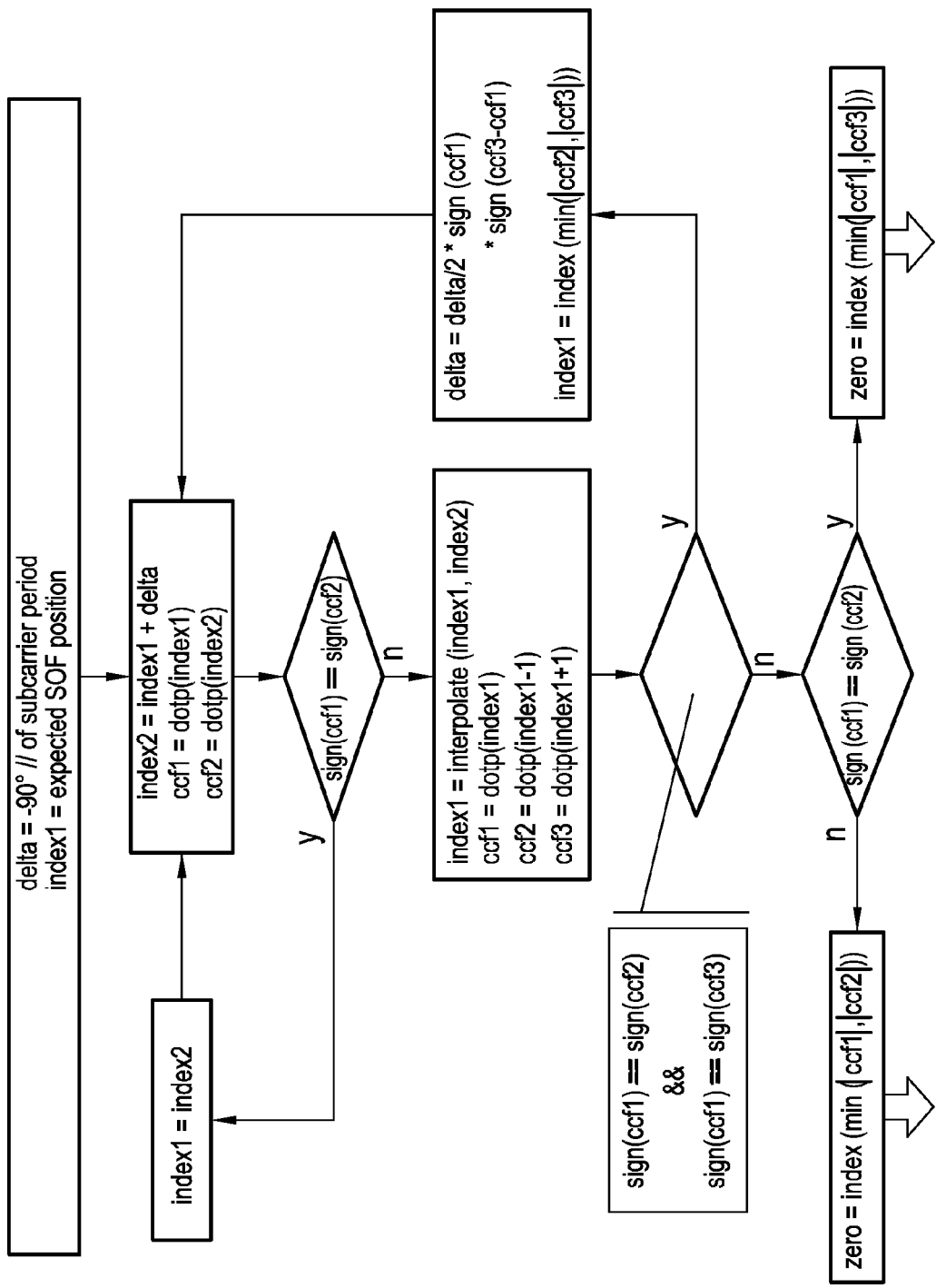
FIG. 8 shows in a flow chart an algorithm for zero detection according to the invention.

The fact that in the flowchart of FIG. 8 delta always starts with −90° is just a convention. It could also start within ±90° randomly for example. In any case, it is not a good idea to check the slope direction first and choose the direction afterwards, because this needs one additional dot product. A random or fixed implementation has a chance of 50% to choose the right direction. Thus it needs 1.5 dot products on average.

Figure 10:
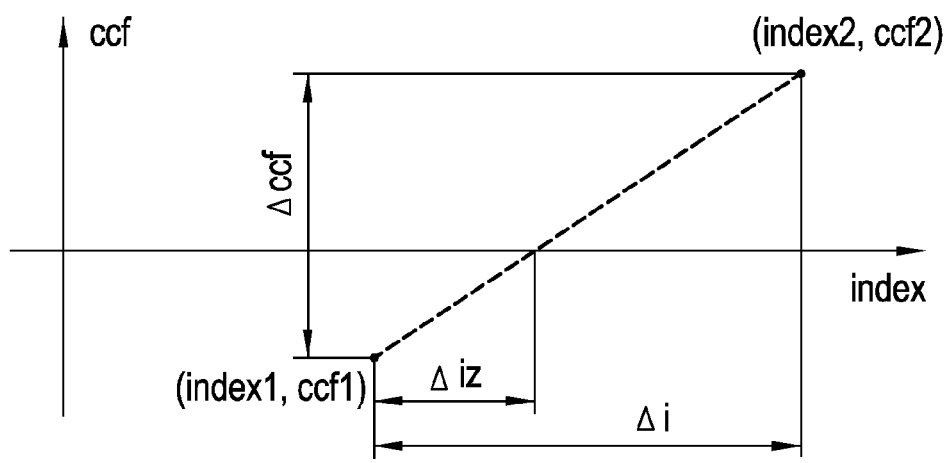
FIG. 10 displays an overview of an interpolation function used in the present invention.

The interpolation function (interpolate(index1, index2)) is implemented according to the following equation (see also FIG. 10 which displays a graphical overview of this interpolation function):

$$\frac{\Delta ccf}{\Delta i} = \frac{ccf1}{\Delta i_Z}$$

$$\Delta i_Z = \Delta i \cdot \frac{ccf1}{ccf1 - ccf2}$$

$$= (\text{index } 2 - \text{index } 1) \cdot \frac{ccf1}{ccf1 - ccf2}$$

Figure 9:
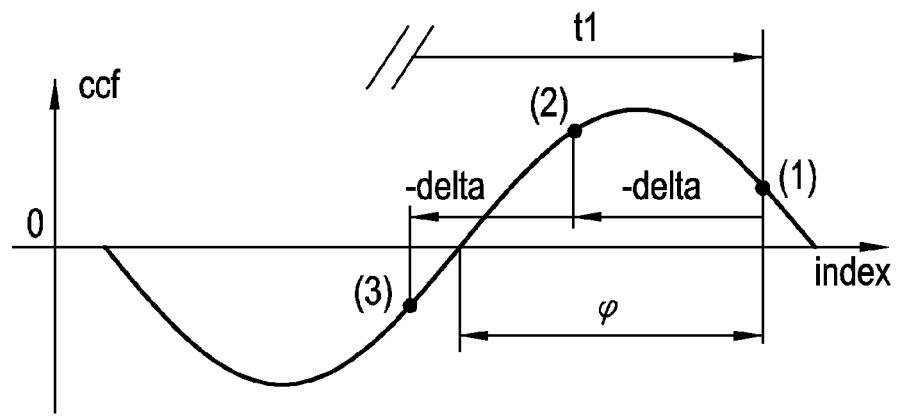
FIG. 9 illustrates the first steps of the "find zero" algorithm according to the invention.

FIG. 9 illustrates the first steps of the "find zero" algorithm according to the invention. First of all, a first cross correlation value (point (1) in the diagram of FIG. 9) is calculated. This first cross correlation value should be located within the tolerance zone tz, preferably close to or at the center of the tolerance zone tz, due to possibly lacking periodicity outside of the tolerance zone tz. Just as a convention, point (1) has been chosen at the expected delimiter occurrence time t1 (see also FIG. 5). Next, a second correlation value point (2) is calculated at a location that is offset from point (1) by a predefined delta (for instance −90°). Next, the signs of correlation points (1) and (2) are compared. If the signs are equal, as in this case, this means that no zero is between points (1) and (2), and a third correlation point (3) offset from point (2) by the delta of −90° has to be calculated. Once again, a comparison of the signs of points (2) and (3) has to be carried out. As these signs are different it is clear that a zero of the cross correlation function CCF is present between points (2) and (3), which zero can be approximated by the following formula:

$$zero = index1 + \text{round}(\Delta iZ)$$

Diagram of FIG. 9 also shows the phase $\phi$ of the cross correlation function CCF in respect to the expected delimiter occurrence time t1.

Since at this stage of the process already at least two points of the cross correlation function CCF are known surrounding the zero crossing of this function, it can be determined whether the zero lies on a rising or a falling edge of the cross correlation function CCF.

Figure 11:
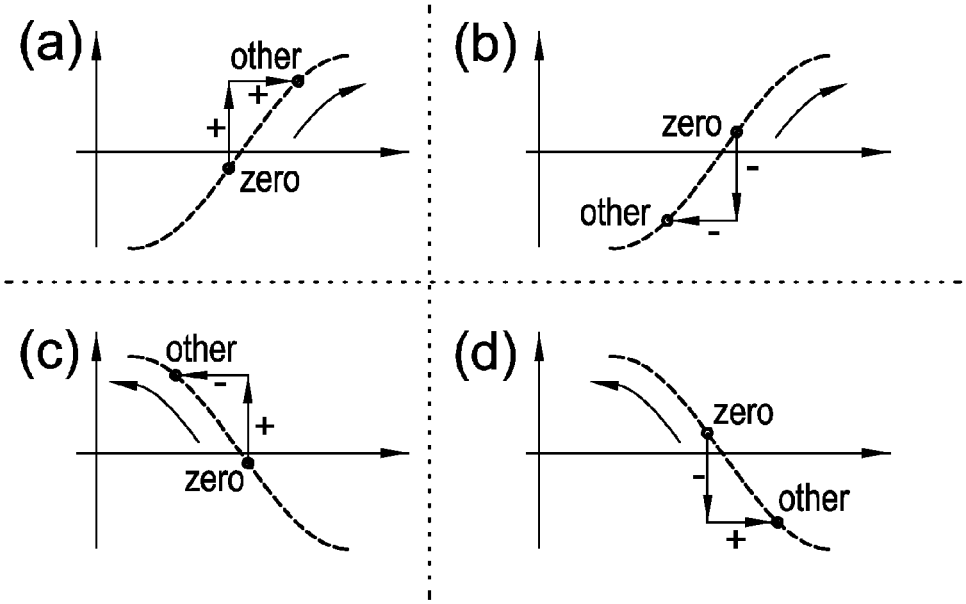
FIG. 11 explains in four diagrams how to determine whether a zero lies on a rising or falling edge of the correlation function.

According to that information, the next maximum (at ±90°) can be distinguished from the next minimum (at ∓90°) by calculating the index direction as shown in FIG. 11. FIG. 11 shows the four possible direction cases. In these diagrams the point zero is that of the calculated points of the correlation function that is closest to the actual zero crossing of the correlation function. The point other is another point of the cross correlation function having a different sign than zero.

The direction is calculated as follows:

$$dir = \text{sign}(\Delta x) \cdot \text{sign}(\Delta y)$$

with $$\Delta x = \text{index}_{other} - \text{index}_{zero}$$

$$\Delta y = ccf_{other} - ccf_{zero}$$

If dir is positive, the next maximum is to the right (increasing index). If dir is negative, the next maximum can be found to the left (decreasing index).

Confirm Zero

Figure 6A:
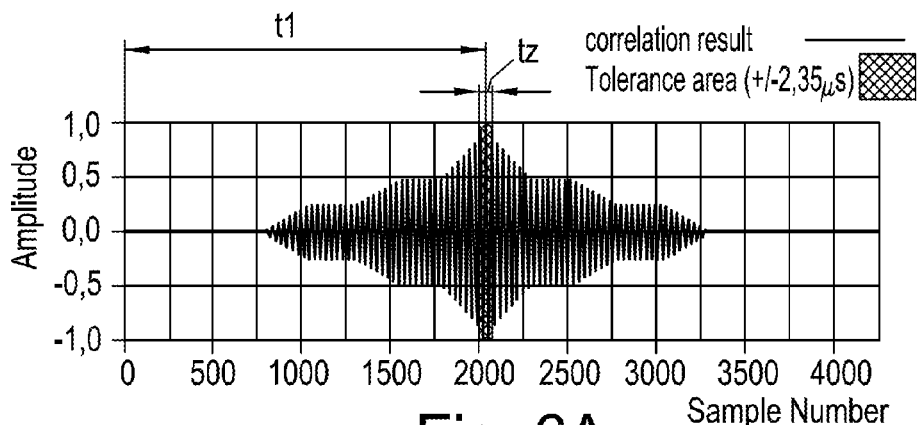
FIG. 6A shows a correlation result of an ideal sinusoidal SOF pattern with the SOF pattern of FIG. 1.
Figure 6B:
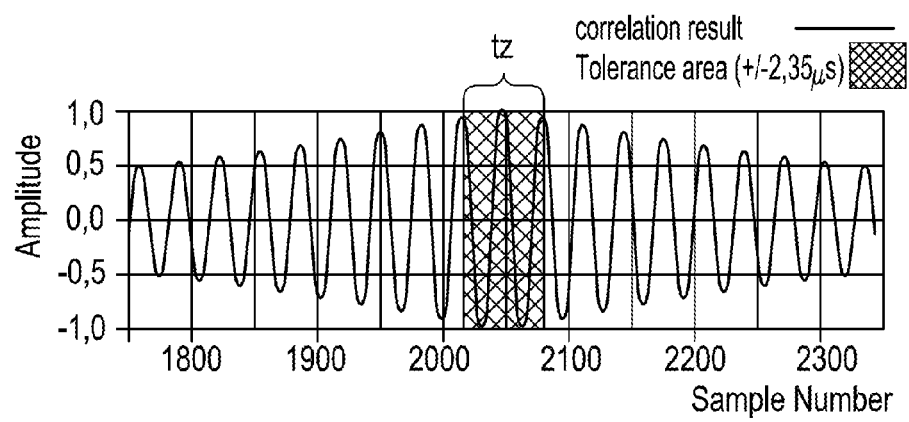
FIG. 6B shows a zoomed portion of the correlation function of FIG. 6A.

In case of distortions, the correlation result will not look like displayed in FIGS. 6A and 6B, but the cross correlation function will be less periodic and look less like a sine. Thus zeros of the cross correlation function will jitter. In order to achieve good results it may be necessary to confirm the found zero by double-checking it with other zeros of the cross correlation function within the tolerance zone tz. As this functionality affords computation of additional values of the cross correlation function CCF the necessity to implement this function constitutes a considerable increase in needed computing power.

Figure 1:
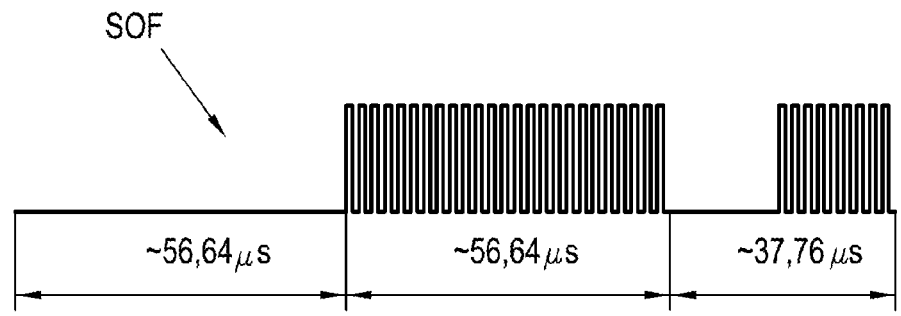
FIG. 1 shows a diagram of an ideal SOF pattern.
Figure 2:
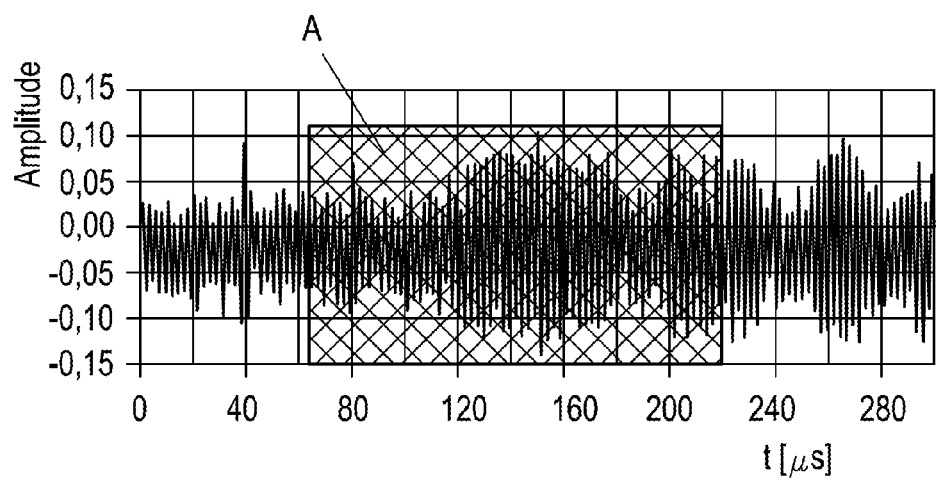
FIG. 2 shows a distorted input signal of an RFID reader containing a SOF pattern.

Detecting zeros of the cross correlation function is equivalent with detecting a phase of the cross correlation function, since the period of the cross correlation function is known as the period of the subcarrier signal (or alternatively of the carrier signal, depending on which one is modulated by the delimiter pattern). For FSK a mixed phase of the two subcarriers occurs having an approximate (predictable) mixed period within the tolerance zone tz. In this respect it should be pointed out that the cross correlation function depicted in FIG. 6A and FIG. 6B is actually a function of the correlation of the square SOF pattern of FIG. 1 with an amplitude shift keyed (ASK) signal that comprises a subcarrier modulated by an ideal sinusoidal SOF pattern. By detecting the zeros or the phase of the subcarrier first, the positions of all zeros and maxima of the cross correlation function can be derived, as the period of the correlation function corresponds to the subcarrier period for ASK. Hence, when the subcarrier phase is known, only a few correlation values have to be calculated to find the maximum. For frequency shift keying FSK, the period of the cross correlation function is not constant as for ASK. Nevertheless, the period is constant enough for the algorithm of the present invention to work, as long as the ISO tolerance is met. Performance may decrease slightly for FSK compared to ASK though.

Since detecting zeros of the cross correlation function is equivalent to detecting the phase of the cross correlation function the invention also proposes to carry out discrete fourier transformation DFT-Approximation as an alternative approach to CCF-Approximation.

DFT Approximation

Discrete fourier transformation (DFT) approximation is used to directly detect the subcarrier phase in respect to an arbitrarily defined reference position within the tolerance zone tz, e.g. in respect to the expected delimiter occurrence time t1. Detecting the subcarrier phase is equivalent to detecting the phase $\phi$ of the cross correlation function CCF. The DFT is carried out for those parts of the SOF pattern where the subcarrier is present (see FIG. 1). DFT yields the subcarrier phase and frequency. Using the resulting phase information, the index of a zero or maximum can easily be computed. Since the phase $\phi$ computed by DFT is determined in both value and sign, it is not necessary to carry out the "find next maximum" algorithm for the following reasons. Detecting the subcarrier phase by DFT is equivalent to a search for maxima in the correlation results. The reason for this is that the subcarrier phase+90° is the "phase of the correlation result" (for sinus due to integral calculation). Because of this phase shift of 90° a phase of zero of the subcarrier represents a maximum of the correlation signal.

Having detected the maxima by either CCF-approximation or DFT-approximation the maximum next to the expected SOF position has to be found.

Calculate Maximum Next to Expected SOF Position

The phase or the zero position is used to calculate the index of a maximum next to the expected SOF position. This way, it is made sure that the found maximum is within the tolerance zone, and the maximum of the whole correlation is within a radius of one peak (for ±2.35 μs tolerance).

Dot Products

After a maximum near the expected SOF position has been found, a few correlation values have to be calculated. These correlation values are provided by a dot product.

Replacement of the correlation function by a dot product is possible due to the fact that $$\vec{a} \cdot \vec{b} = a_1 b_1 + a_2 b_2 + \ldots + a_N b_N = \sum_{n=1}^{N} a_n \cdot b_n$$

defines the dot product and $$r_{xy}[k] = \sum_{n=-\infty}^{\infty} x[n] y[n-k]$$

is the correlation.

By defining $$\vec{a}(n)=0 \text{ for } n<1 \text{ and } n>N$$

$$\vec{b}(n)=0 \text{ for } n<1 \text{ and } n>N$$

we get $$\vec{r}_{xy}[k]=\vec{x}[n]\cdot\vec{y}[n-k]$$

As dot products need considerable computing power, their use should be minimized. No more than three values within the tolerance zone are calculated, namely the three peak values, depending on the position of the tolerance area. If SOF position cannot be assumed to be within a range of one peak, more than these values have to be calculated. Next, all dot product values are compared with each other to find the highest one. Its location (expressed by its index) is the position where the bitstream of response data RESP starts.

Figure 12:
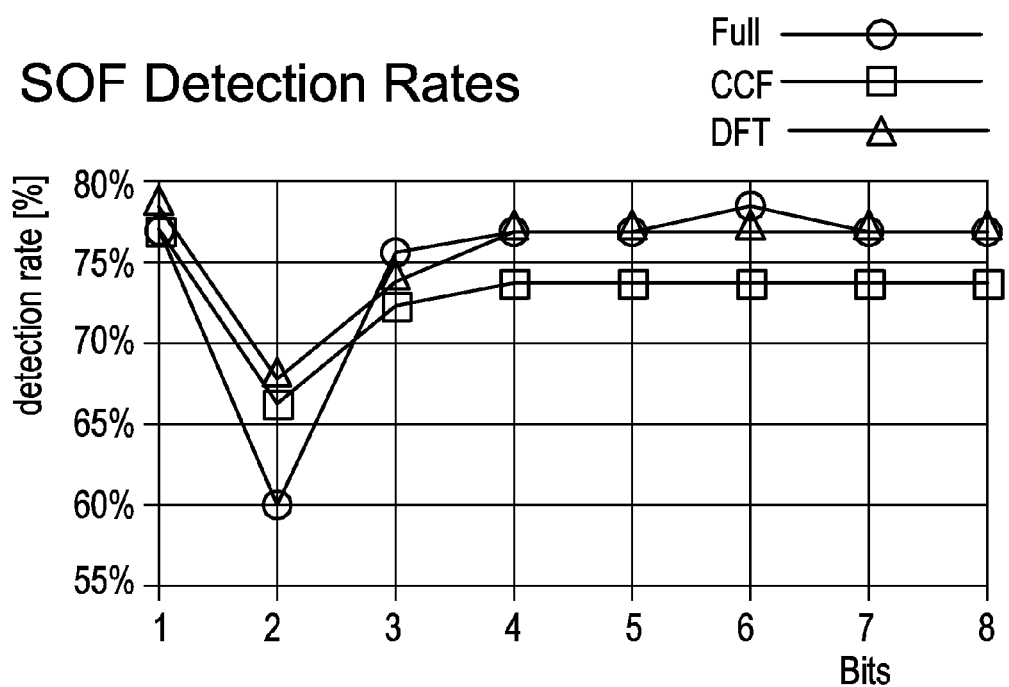
FIG. 12 shows a diagram of the SOF detection rate that is achieved by the invention and according to prior art.

As shown in FIG. 12, the DFT approach according to the invention reaches the performance of full correlation, but with much less computing power needed. With the CCF approximation according to the invention the quality of full correlation is almost achieved. It should be mentioned that the detection rates have been measured in a distorted environment. The term "detected" implies that the position of the delimiter was localized with an accuracy of +/−1 μs. The detection rate significantly increases in undistorted environments.

The inventive RFID reader may be embedded in form of either hardware, e.g. in implementations as ASICs (Application Specific Integrated Circuits) or FPGAs (Field Programmable Gate Arrays), or by the aid of software executable by data processing means within the RFID reader. In many situations a computer program product that comprises software code portions for performing the steps of the method according to the invention is already pre-stored in such an RFID reader, e.g. in a ROM or EPROM or any other permanent memory. It may also be that the computer program product can be fed into the RFID reader by the aid of a data carrier on which the computer program product is stored.

It is to mention that in the preceding description an RFID reader was indicated as realization of a general contact-less communication device. However it is to note that the scope of the present invention is not limited to such a particular RFID reader embodiment but also any other contact-less communication device like walky-talkies or any other type of professional data communication devices like terrestrial radio link stations or satellites are to be considered.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention may be implemented by means of hardware comprising several distinct elements, and/or by means of a suitably programmed processor. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method performed on a contact-less communication device for detecting a delimiter pattern in a signal stream, wherein the signal stream contains a carrier or subcarrier modulated by the delimiter pattern comprising:
    specifying an expected delimiter occurrence time of an occurrence of the delimiter pattern and a tolerance zone within which the expected delimiter occurrence time may jitter;
    rectifying or demodulating the signal stream to obtain a data stream and performing a zero detection by approximation, within the tolerance zone, to find a zero of the cross correlation function (CCF) of the data stream within the delimiter pattern;
    calculating a first maximum of the cross correlation function (CCF) within the tolerance zone by use of the approximated zero;
    calculating all other maxima of the cross correlation function (CCF) within the tolerance zone;
    detecting a highest maximum among the calculated maxima, which highest maximum is representative for the moment in time of the occurrence of the delimiter pattern.

2. A method as claimed in claim 1 wherein a zero of the cross correlation function (CCF) is approximated by calculating and interpolating some correlation points of the CCF within the tolerance zone.

3. A method as claimed in claim 2 wherein such correlation points are used for zero approximation which lie at different sides of a zero line of the cross correlation function (CCF).

4. A method as claimed in claim 1 wherein an approximated zero is confirmed by double-checking it with other zeros of the cross correlation function (CCF) within the tolerance zone.

5. A method as claimed in claim 1 wherein detecting the phase of the carrier or subcarrier in respect to an arbitrarily defined reference position within the tolerance zone is carried out by fourier transformation, for parts of the delimiter pattern where the carrier or subcarrier is present.

6. An contact-less communication device comprising control means with an arithmetic-logic unit and a memory, wherein the contact-less communication device is adapted to process a computer program product and being configured to detect a delimiter pattern in a signal stream, wherein the signal stream contains a carrier or subcarrier modulated by the delimiter pattern, wherein the contact-less communication device is configured to perform the method comprising:
    specifying an expected delimiter occurrence time of an occurrence of the delimiter pattern and a tolerance zone within which the expected delimiter occurrence time may jitter;
    rectifying or demodulating the signal stream to obtain a data stream and performing a zero detection by approximation, within the tolerance zone, to find a zero of the cross correlation function (CCF) of the data stream within the delimiter pattern;
    calculating a first maximum of the cross correlation function (CCF) within the tolerance zone by use of the approximated zero;
    calculating all other maxima of the cross correlation function (CCF) within the tolerance zone;
    detecting a highest maximum among the calculated maxima, which highest maximum is representative for the moment in time of the occurrence of the delimiter pattern.

7. A computer program product comprising software code portions for performing the steps of a method according to claim 1 wherein the computer program product is stored on a non-transitory computer readable medium.

8. A method performed on a contact-less communication device for detecting a delimiter pattern in a signal stream, wherein the signal stream contains a carrier or subcarrier modulated by the delimiter pattern (SOF), the method comprising:

specifying an expected delimiter occurrence time of an occurrence of the delimiter pattern and a tolerance zone within which the expected delimiter occurrence time may jitter;

rectifying or demodulating the signal stream to obtain a data stream and detecting the phase ($\phi$) of the carrier or subcarrier in respect to an arbitrarily defined reference position within the tolerance zone;

calculating a first maximum of a cross correlation function (CCF) of the data stream (DS) with the delimiter pattern, within the tolerance zone by use of the approximated phase ($\phi$);

calculating all other maxima of the cross correlation function (CCF) in the tolerance zone;

detecting the highest maximum among the calculated maxima, which highest maximum is representative for the moment in time of the occurrence of the delimiter pattern.

9. A method as claimed in claim 8 wherein detecting the phase of the carrier or subcarrier in respect to an arbitrarily defined reference position within the tolerance zone is carried out by fourier transformation for parts of the delimiter pattern where the carrier or subcarrier is present.

10. A method as claimed in claim 9, wherein the phase ($\phi$) of the carrier or subcarrier is detected in respect to the expected delimiter occurrence time.

11. A computer program product comprising software code portions for performing the steps of a method according to claim 8, wherein the computer program product is stored on a non-transitory computer readable medium.

\* \* \* \* \*